United States Patent
Burger et al.

(10) Patent No.: US 7,612,482 B2
(45) Date of Patent: Nov. 3, 2009

(54) ELECTRIC MOTOR WITH BRUSH PLATE

(75) Inventors: Helmut Burger, Moorenweis (DE); Stefan Aust, Puergen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/523,905

(22) Filed: Sep. 19, 2006

(65) Prior Publication Data
US 2007/0063611 A1    Mar. 22, 2007

(30) Foreign Application Priority Data
Sep. 20, 2005  (DE) .................. 10 2005 000 120

(51) Int. Cl.
*H02K 13/00* (2006.01)
(52) U.S. Cl. .................. 310/239; 310/241; 310/245; 310/246; 310/247
(58) Field of Classification Search ............ 310/239, 310/51, 241, 245, 246, 247
See application file for complete search history.

(56) References Cited

U.S. PATENT DOCUMENTS

| 4,673,838 | A | * | 6/1987 | Takagi et al. ............... 310/239 |
| 4,715,732 | A | | 12/1987 | Sanders |
| 4,851,730 | A | * | 7/1989 | Fushiya et al. ............... 310/249 |
| 4,866,322 | A | * | 9/1989 | Baumeister et al. .......... 310/239 |
| 6,329,735 | B1 | | 12/2001 | Tanaka |
| 6,359,363 | B1 | * | 3/2002 | Foerstera et al. ............ 310/239 |
| 6,445,104 | B1 | * | 9/2002 | Sato ........................... 310/239 |
| 2003/0015933 | A1 | * | 1/2003 | Takahashi et al. ........... 310/239 |

FOREIGN PATENT DOCUMENTS

| DE | 3636539 A1 | 5/1987 |
| DE | 10153574 A1 | 8/2003 |
| GB | 2384918 A | 8/2003 |
| JP | 2000324766 A | * 11/2000 |

\* cited by examiner

*Primary Examiner*—Quyen Leung
*Assistant Examiner*—Alex W Mok
(74) *Attorney, Agent, or Firm*—Abelman, Frayne & Schwab

(57) ABSTRACT

An electric motor fixedly axially securable in a housing includes a brush plate with a plurality of axially projecting, uniformly circumferentially distributed, convexly shaped, locking segments formed on the brush plate. The brush plate and the locking segments may be formed of an injection-moldable plastic material. The locking segments may be spherically shaped, and the there may be four locking segments. The brush plate may include a plurality of radial, circumferentially distributed, stop surfaces with which are associated a corresponding plurality of radially inwardly projecting radial guides in the housing.

5 Claims, 3 Drawing Sheets

ELECTRIC MOTOR WITH BRUSH PLATE

BACKGROUND OF THE INVENTION

1. Field of the Invention

The present invention relates to an electric motor with a brush plate and in particular, to a universal motor for use in an electrical hand-held power tool.

2. Description of the Prior Art

With electric motors described above, usually, the brush plate is separately screwed in the housing.

German Publication DE 36 36 539 discloses a universal motor for an electrical hand-held power tool which is mounted in a two-part housing that is screwed with two screws. Both parts of the housing are formed as pot-shaped parts. On one of the housing parts, there are provided projections which a brush plate made of a plastic material abuts in the axial direction. In an opposite axial direction, the brush plate lies on the plastic base of the stator and is secured, together with the stator, axially in the housing with screws.

German Publication DE 101 53 574 discloses a rotatable brush plate with a plurality of circumferentially distributed hooks formed thereon. The hooks lockingly axially engage from behind associated ribs provided in the housing. Thereby, the brush plate is permanently axially secured in the housing. Tensioning and bending forces, which are necessarily generated by concave hooks, produce local stresses in a brush plate formed of a plastic material. These stresses are generated outside of the reversibly elastically deformable region. Therefore, because of the viscoelastic behavior of the material, retardation of the material and of the hooks takes place. As a result, with time, loss of the axial locking takes place. High temperatures, which are usually observed with universal motors of hand-held power tools, accelerate this behavior.

Accordingly, an object of the present invention is to provide long-lasting means, in particular, suitable for mass production, for reliably axially securing a brush plate.

SUMMARY OF THE INVENTION

This and other objects of the present invention, which will become apparent hereinafter, are achieved by providing a brush plate with a plurality of axially projecting, uniformly circumferentially distributed, convexly shaped, locking segments formed thereon.

Circumferentially distributed, axially projecting, convexly spaced, locking segments, which insure resiliency along a certain axial locking path, provide for an axial locking of the brush plate in a technologically simple manner. In convexly shaped locking segments, the hydrostatic pressure, which is generated by locking forces, is produced without substantial geometrical changes. This can be probably attributed to the fact that with a uniaxial compression load, a compact convexly shaped body is geometrically similar to the formed deformation region, so that a uniaxial pressure load is converted, as a result of internal forces generated in the convexly shaped body, in a hydrostatic pressure acting in all directions. A (all-sided) hydrostatic pressure (that is a pure third invariant of a stress tensor) is established, (with all materials) without change of the shape, in contrast to one-or two-sided compression stresses. This is possible because of absence of hydrostatic shear stresses which represent second invariant of the stress tensor. The one- or two-sided stresses lead, at high stresses, starting from plastic deformation to a breakdown. Thus, already in the reversibly elastic deformation region of the material of locking elements, relatively high (in comparison with other geometries) contact forces are produced that remain stable for a long time.

Advantageously, the brush plate and the locking segments are formed of an injection-moldable plastic material, e.g., polyamid (Pl), so that the locking segments are directly formed on the brush plate during production of the brush plate by an injection-molding process. Thus, no additional process steps or components are needed.

Advantageously, the locking segments have a spherical shape. Thereby, upon axial locking, primary acting point contact produces, as a result of the Hertzian pressure with the counter-contact surface of the stressed housing part, a large-surface pressure contact area already after a relatively short (in comparison with other contact surfaces) axial locking path, which contact area is adjoined by a corresponding large-volume deformation region which is deformable by a hydrostatic pressure.

Advantageously, there are provided four, circumferentially distributed, locking segments. Thereby, upon screwing the electric motor with two diametrically opposite screws, the two respective, circumferentially adjacent locking segments form a two-point support per single screw on the housing. The two-point support becomes loaded upon elastic bending of the brush plate.

Advantageously, the brush plate has four radial circumferentially distributed stop surfaces which are associated with corresponding, inwardly projecting radial guides provided in the housing. Thereby, the axially lockingly secured brush plate can be guided in a technologically simple maimer with respect to its radial position.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENTS

Figure 1:
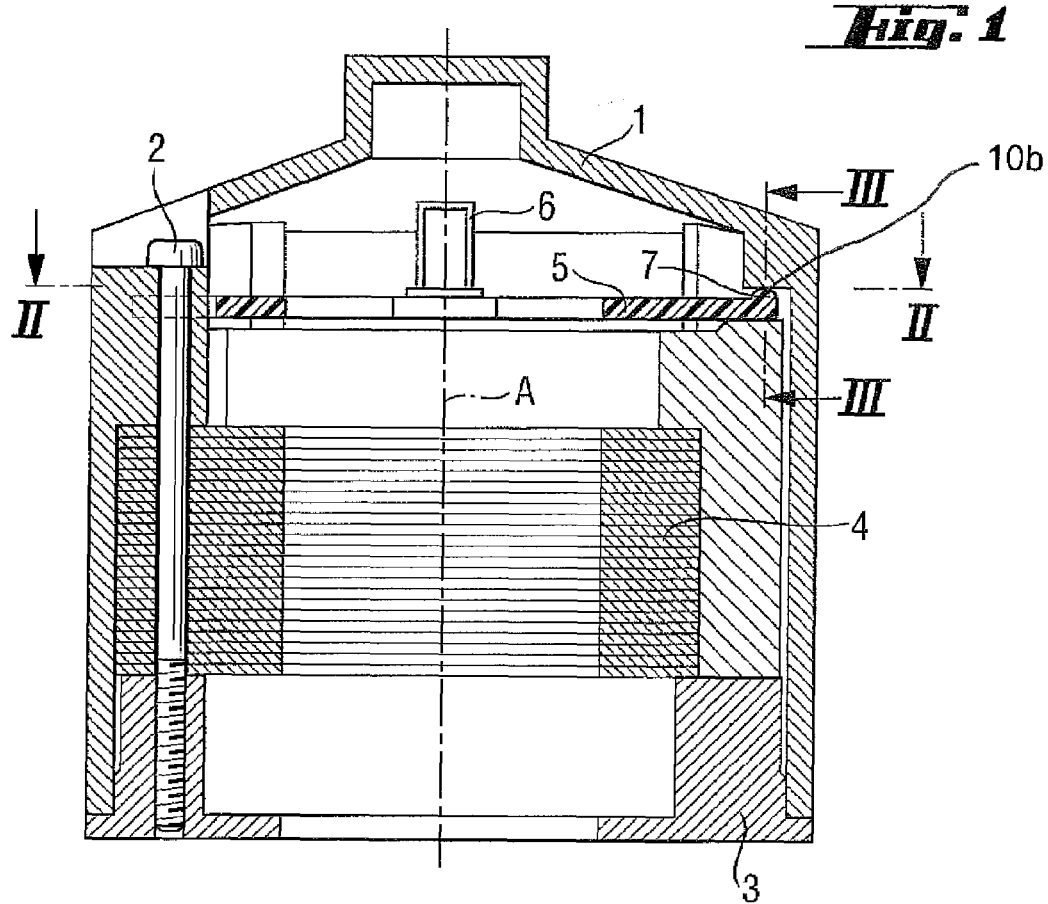
FIG. 1 a schematic longitudinal cross-sectional view of an electric motor according to the present invention.
Figure 2:
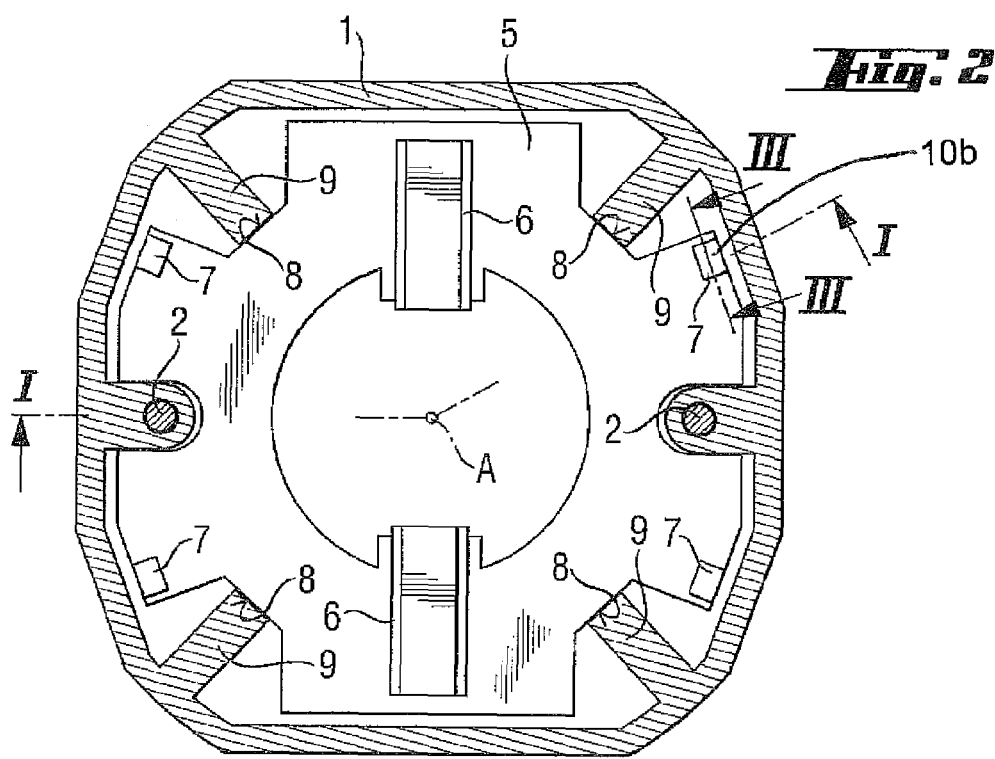
FIG. 2 a cross-sectional view along lines II-II in FIG. 1.

An electric motor 4 (only its stator core stack is shown) according to the present invention, which is shown in FIGS. 1 and 2, is fixedly secured in a housing 1 along an axis A with two screws 2 and an air duct 3. The electric motor 4 has a brush plate 5 formed of an injection-moldable polyimid and with two carbon guides 6. On the brush plate 5, there are provided four, uniformly circumferentially distributed, convex locking segments 7 projecting axially toward the housing 1. During screwing the electric motor 4 with two diametrically opposite screws 2, the two respective, circumferentially adjacent locking segments 7 form a two-point support per single screw 2 on the housing 1. In addition, the brush plate 5 has four radial circumferentially distributed stop surface 8 which are associated with corresponding, inwardly projecting radial guides 9 provided in the housing 1.

Figure 3:
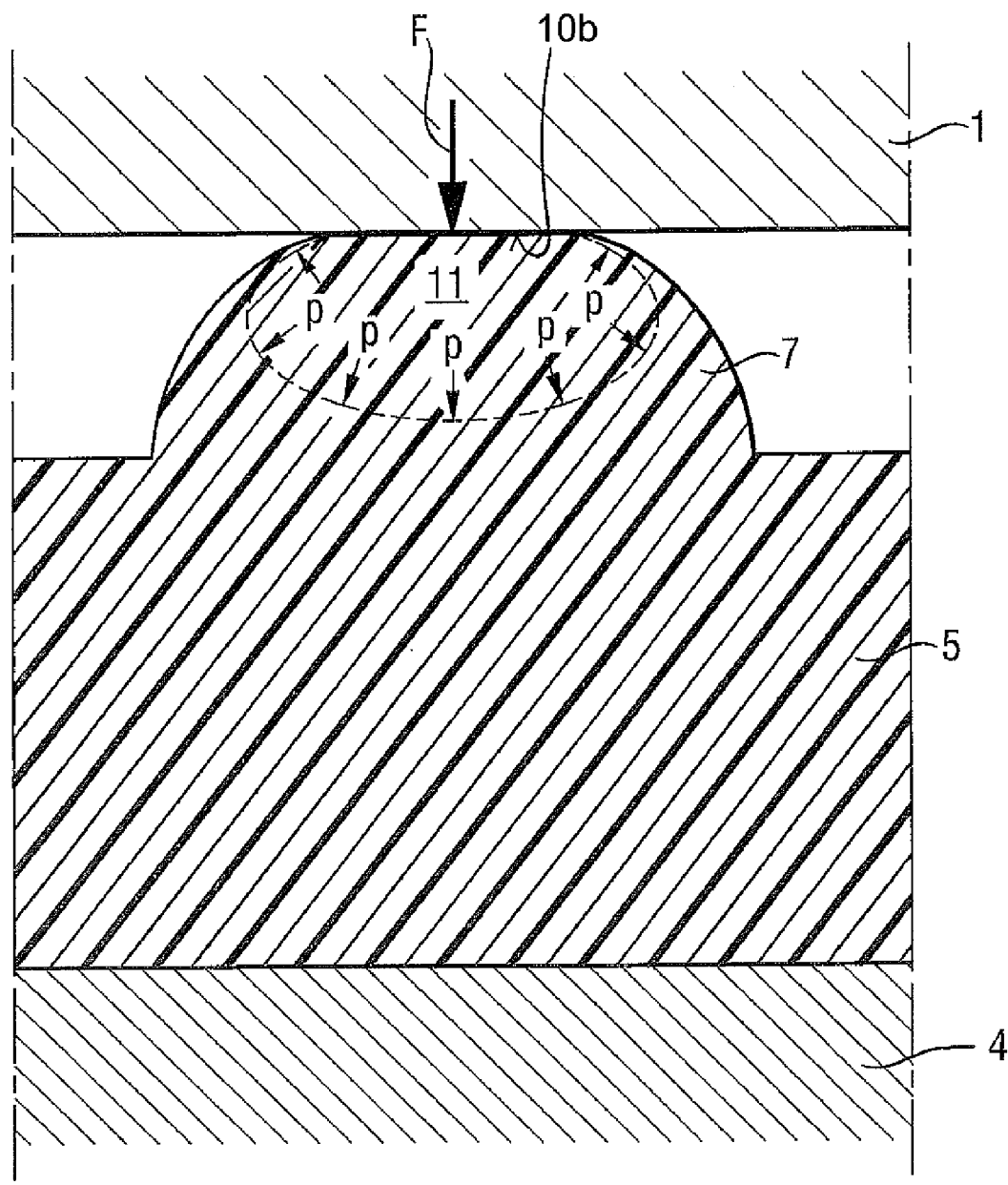
FIG. 3 an axially tangential cross-sectional view of a deformed locking segment along lines III-III in FIGS. 1 and 2.
Figure 4:
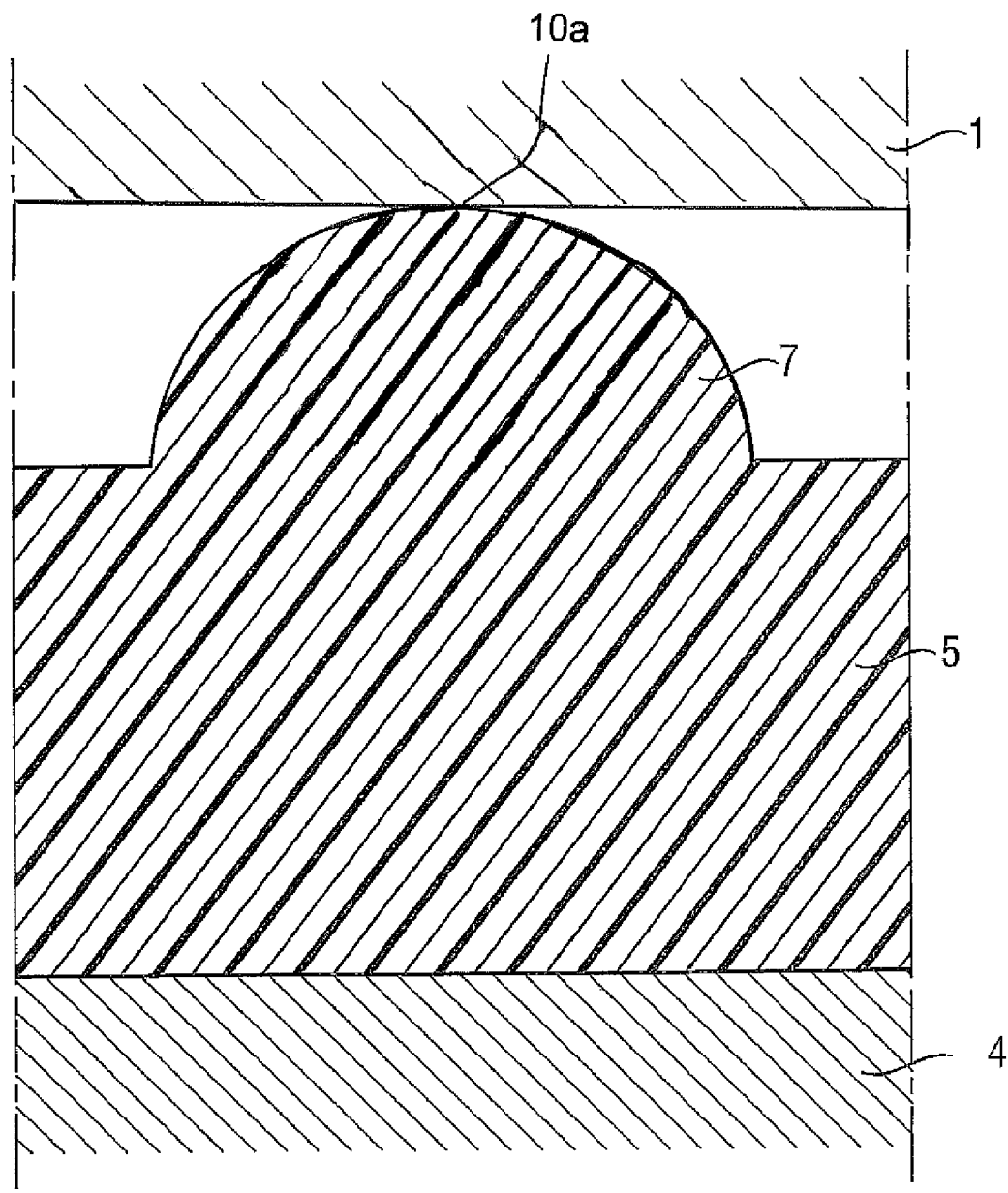
FIG. 4 an axially tangential cross-sectional view of an undeformed locking segment.

As shown in FIG. 4, each of the locking segments 7, which are formed integrally with the brush plate 5, has a spherical profile in the axial direction, and has an initial contact region 10a contacting the base 1, with the initial contact region 10a having a first surface area which is relatively small. Under action of a uni-dimensional pressure force F, upon pressure contact with the housing 1 on the locking segments 7, the locking segments 7 deform, and a pressure contact region 10b is formed on each locking segment 7, as shown in FIG. 3, with the pressure contact region 10b contacting the housing 1 and having a second surface area which is larger than the first surface area of the undeformed initial contact region 10a. A corresponding large-volume deformation region 11, which is reversibly deformed by a hydrostatic pressure p, adjoins the pressure contact region 10b. The shape of the deformation region 11 is similar to the compact, spherically shaped locking segment 7.

Though the present invention was shown and described with references to the preferred embodiment, such is merely illustrative of the present invention and is not to be construed as a limitation thereof and various modifications of the present invention with be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. An electric motor fixedly axially secured in a housing (1), comprising:
   a brush plate (5) having, as monolithically formed elements thereof, a plurality of locking segments (7), wherein the locking segments (7) are axially projecting, uniformly circumferentially distributed, convexly shaped, locking segments (7) each of which is monolithically formed on the brush plate (5), with each locking segment (7) contacting the housing (1) at a respective initial contact region (10a) of each locking segment (7), and with each initial contact region (10a) having a respective first surface area;
   wherein each of the plurality of locking segments (7) responds to pressure on the housing (1) to form a respective pressure contact region (10b) having a second surface area larger than the first surface area.

2. An electric motor according to claim 1, wherein the brush plate (5) and the locking segments (7) thereof are monolithically formed together from an injection-moldable plastic material.

3. An electric motor according to claim 1, wherein the plurality of locking segments (7) are spherically shaped locking segments (7), each of which is monolithically formed on the brush plate (5).

4. An electric motor according to claim 1, wherein the brush plate (5) includes four locking segments (7) as the plurality of locking segments (7) monolithically formed thereof.

5. An electric motor according to claim 1, wherein the housing (1) includes therein a plurality of radially inwardly projecting radial guides (9); and
   wherein the brush plate (5) has a plurality of radial, circumferentially distributed, stop surfaces (8) associated with the corresponding plurality of radially inwardly projecting radial guides (9) provided in the housing (1).

* * * * *